Feb. 5, 1946.  R. C. BARRETT  2,394,138
GLASS CUTTER
Filed Feb. 7, 1944
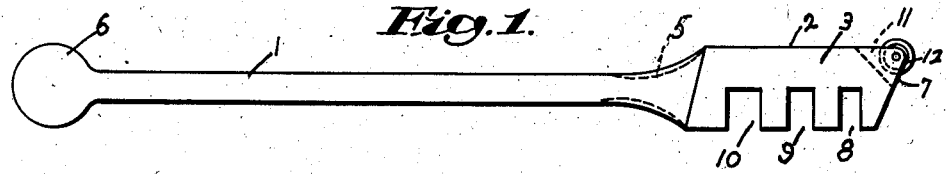
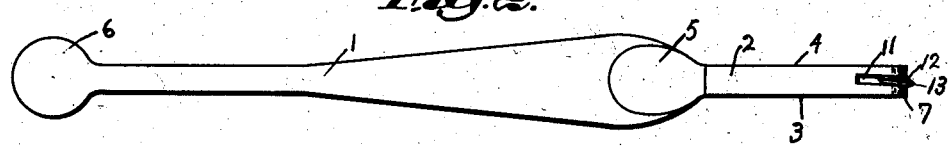
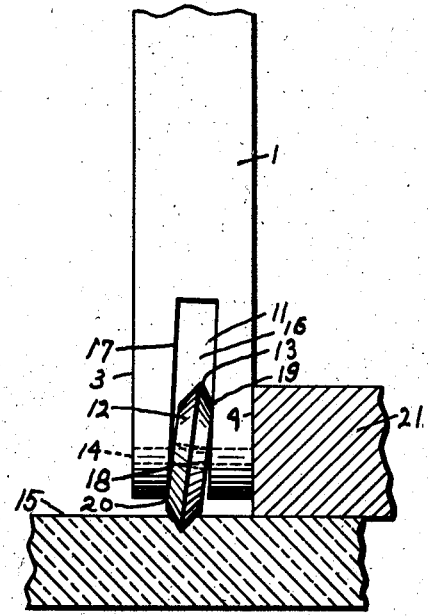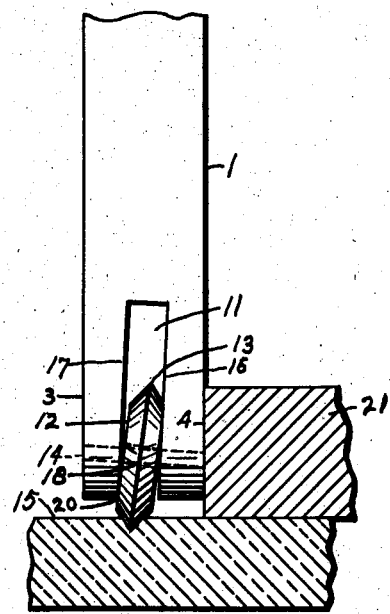
Inventor:
Richard C. Barrett,
By Heard Smith & Tennant
Attorneys Patented Feb. 5, 1946

2,394,138

UNITED STATES PATENT OFFICE 2,394,138

GLASS CUTTER

Richard C. Barrett, Bristol, Conn., assignor of one-half to Robert W. Barrett, Bristol, Conn.

Application February 7, 1944, Serial No. 521,373

3 Claims. (Cl. 49—52)

This invention relates to improvements in glass cutters of the type in which a thin sharp edge cutting disk is mounted upon means through which suitable pressure may be applied to the cutting disk to score the glass.

The conventional method of mounting a glass cutter disk has been in parallel relation to the axis of the tool along which the pressure is applied and in the conventional use of the cutter the wheel rotates in a vertical plane at right angles to the surface of the glass being cut.

Professional glass cutter users are cognizant of the fact that an improved cut will result from tilting the whole tool slightly from the vertical when cutting. This expedient, however, is dangerous since it reduces the contact of the tool with the guiding straight edge or template. The casual user who constitutes the numerical majority of the public moreover is not aware of the advantage of slightly tilting the tool and does not naturally tilt the tool, but applies a vertical force relatively to the surface of the glass.

The probability of the breaking of the glass along the scoring mark produced by the glass cutter is greatly enhanced if the scoring mark is a perfect V in the glass. To obtain this perfect V cut it is essential that the cutting edge of the disk travel in an exactly uniform plane the full length of the cut, as strains set up by the crushing action of the disk on the glass will otherwise induce spalling of the glass from the edges of the cut. Such spalls of course reduce the strength of the glass at unpredictable points and frequently cause the deviation of the break from the scored line.

Minimum manufacturing and working tolerances require some clearance between the sides of the cutting disk and the slot in which it is contained. When the tool is held in a vertical position in cutting the wheel is thereby allowed to wobble slightly. This induces spalling of the edges of the cut and results in poor breaks.

The principal object of the invention is to provide a glass cutter having a rotatable disk provided with a sharp circular cutting edge with means for preventing wobbling of the cutter disk throughout the cutting operation thereby to secure a perfect scoring of the glass along a predetermined line and to avoid spalling of the glass from the edges of the scored line.

A further object of the invention is to provide a rotatable disk cutter having a sharp circular cutting edge with means for applying a cut-producing force thereto in a direction slightly inclined to the plane of rotation of the cutting edge of the disk so that the lateral resultant of the pressure will continuously force the cutter toward the guiding means which directs it in a predetermined path.

More specifically the invention consists in so mounting the cutting disk upon a shaft crossing the bifurcated end portion of the straight handle of a manually operable glass cutter in a plane so inclined to the axis of the handle that when the necessary cutting pressure is applied in a direction axially of the handle the disk will be forced to assume a position inclined to the axis of the handle and supported at three concurrent bearing points, one upon the axis upon which the wheel is rotatably mounted, another by engagement of one side of the cutting disk in proximity to its periphery with one wall of the slot above the axis of the disk, and the third by engagement of the opposite side of the disk, preferably at a like distance from its periphery, with the opposite wall of the slot below the axis of the disk. Such mounting can be most simply provided by merely milling a slot in the head of the handle of slightly wider width than the thickness of the disk in a plane slightly inclined to the axis of the handle along which cutting pressure is applied and mounting the disk upon a shaft, of slightly less diameter than that of the central bore of the disk, crossing the slot at right angles to the axis of the handle, or by mounting the disk upon a shaft extending across the inclined slot perpendicular to the inner walls thereof.

It could also be accomplished by changing the plane of any part of the tool in such manner that the plane of rotation of the disk would not be at right angles to the surface of the glass. The angle can be varied considerably one way or the other so long as the complementary angle of the cutting edge of the disk is correspondingly altered as required.

The invention is not confined to the single application in a conventional single disk plane glass cutter but may be equally employed in tube cutters, circular cutters, etc.

By reason of the present invention ultra precision in the whole workmanship of the tool which would be costly but necessary to hold the disk in an undeviating plane by conventional methods will be avoided.

Furthermore by reason of the present invention the percentage of perfect breaks from cuts made by general users of glass cutters will be greatly increased.

A preferred embodiment of the invention as applied to a usual type of manual glass cutter is illustrated in the accompanying drawing, in which, Fig. 1 is a side elevation of a glass cutter embodying the invention;

Fig. 2 is a plan view of the same;

Fig. 3 is an enlarged detail view of an end portion of the handle of the glass cutter having a slot therein inclined to the axis of the handle with a disk mounted upon a shaft which when the handle is in vertical position is parallel to the plane of the glass and illustrating also in section a portion of the glass being scored and the guide for the cutter engaging one side of the handle member; and Fig. 4 is an enlarged view similar to Fig. 3 showing the cutting disk as mounted upon a shaft which is parallel to the axis of rotation of the disk and consequently inclined to the plane of the surface of the glass.

The glass cutter illustrated in the accompanying drawing comprises a metal handle member 1 having an integral narrow head 2 having substantially parallel flat sides 3 and 4 and provided with a concave depression 5 in proximity to the head in which the finger of the user may be seated, and having a spheroidal end portion 6 adapted to be used as a hammer to start the break by cracking the glass along the score line. The head 2 terminates in an angular end 7 and at one side is provided with usual spaced slots 8, 9 and 10 adapted to engage edge portions of glass of different thickness extending beyond the scored line and adapted by angular movement of the handle to break away such portions.

In conventional cutters the angular end portion of the cutter is provided with a slot for the cutting disk which extends in parallelism to the axis of the handle. In the present invention a slot 11 is milled or otherwise formed in the end of the cutter extending in a direction slightly inclined to the longitudinal axis of the handle. A thin cutting disk 12 having a circular sharp cutting edge 13 is mounted upon a suitable shaft extending through the bifurcated end portion of the cutter produced by the slot 11 with a slight tolerance between the shaft and the central bore of the disk.

As illustrated in Fig. 3 the shaft 14, which extends through and is fixedly mounted in the arms of the bifurcated head of the handle, is perpendicular to the axis of the handle and the disk 12, which is provided with a bore slightly larger in diameter than that of the disk, is mounted upon the shaft so that when the cutter is pressed downwardly vertically in the direction of the axis of the handle to force the cutting disk into engagement with the glass the shaft 14 will be parallel to the plane 15 of the glass and the disk tilted in such manner that opposite faces of the glass will engage opposite walls of the slot and its cutting edge 13 held in slightly inclined relation to the plane of the glass.

In the construction shown in Fig. 4 the shaft 14 extends through and is fixedly mounted in the ends of the arms of the bifurcated head of the handle in a direction perpendicular to the walls 16 and 17 of the inclined slot 11 and the disk is consequently slightly inclined to the plane 15 of the glass.

In each of these cases pressure applied in the axial direction of the handle produces a pressure upon the disk causing it to bear upon the under side 18 of the shaft and the resultant force of the pressure to cause the side of the disk adjacent its periphery to bear against the wall 16 of the slot along a line 19 above the axis of the disk and also to bear against the opposite wall 17 of the slot along a line 20 preferably an equal distance below the shaft upon which the disk is mounted.

By reason of this construction the resultant force of the inclined disk when its cutting edge is forced downwardly by pressure applied axially of the handle will force the flat side 4 of the head of the cutter against a straight edge or template 21 thereby maintaining the cutter continuously in engagement with the straight edge or platen and also causing the cutter disk to travel in an exactly uniform plane throughout the full length of the cut, thus avoiding the wobbling and spalling action of the cutter and producing a clean uniform cut.

It will be understood that while the invention is particularly described with reference to a usual type of manually operable glass cutting tool, it may also be embodied in other types of glass cutting devices such as those employed for cutting circles, tubes, or the like, so long as the plane of the cutting edge of the disk is sufficiently inclined to the direction in which force is applied to maintain the direction through which the cutting force is applied slightly inclined to the plane of the cutting edge of the disk.

It will therefore be understood that the glass cutter particularly shown and described herein is of an illustrative character and is not restrictive of the meaning and scope of the following claims.

Having thus described the invention, what is claimed as new, and desired to be secured by Letters Patent, is:

1. A glass cutter comprising a head, through which pressure is applied in the direction of its longitudinal axis, provided at its end with a slot inclined to said axis, a shaft mounted in said head near the end thereof and crossing said slot, a cutting disk of slightly less thickness than the width of said slot having a central bore of slightly greater diameter than that of said shaft mounted on said shaft operable when cutting pressure is applied in the longitudinal direction of the axis of the head to cause one side of said disk to engage a wall of the slot above the shaft and the other side of said disk to engage the opposite wall of said slot below said shaft thereby preventing wobbling of the cutting disk and insuring rotation of the cutting edge of the disk in an undeviating plane.

2. A glass cutter comprising a straight handle having a narrow head provided with a guiding face parallel to the axis of the handle adapted to engage a guide for the score line to be cut in the glass having an inwardly extending slot slightly inclined toward the guiding face of the head, a shaft extending across said slot perpendicular to the axis of the handle, and a cutter disk of slightly less thickness than the width of said slot mounted on said shaft operable when cutting force is applied in the axial direction of said handle to cause opposite sides of said disk to engage the respective walls of said slot above and below said shaft and to produce a resultant force which will maintain the guiding face of the head continuously in contact with the guide for the score line.

3. A glass cutter comprising a straight handle having a narrow head provided with a flat guiding face parallel to the longitudinal axis of the handle having an inwardly extending slot slightly inclined toward the flat face of said head, a shaft extending across said slot perpendicular to the walls thereof, and a cutter disk mounted on said shaft having a central bore slightly greater than that of said shaft and having an acute V-shaped cutting edge adapted to produce a substantially vertical V-shaped score in the glass operable when cutting force is applied in the axial direction of said handle to produce a resultant force which will maintain the guiding face of the head continuously in contact with the guide for the score line.

RICHARD C. BARRETT.